FIG. 2.

Feb. 15, 1927.  
M. H. BLANK  
1,617,986  
INTERNAL COMBUSTION ENGINE  
Filed March 19, 1921    7 Sheets-Sheet 4

FIG. 6.

Inventor:  
MERTON H. BLANK  
By B. D. Watts  
Attorney.

Feb. 15, 1927. 1,617,986
M. H. BLANK
INTERNAL COMBUSTION ENGINE
Filed March 19, 1921 7 Sheets-Sheet 6

Patented Feb. 15, 1927.

1,617,986

UNITED STATES PATENT OFFICE.

MERTON H. BLANK, OF INDIANAPOLIS, INDIANA.

INTERNAL-COMBUSTION ENGINE.

Application filed March 19, 1921. Serial No. 453,545.

This invention relates to internal combustion engines particularly multiple cylinder engines of the so called closed V type.

My invention aims generally at the construction of a V type, internal combustion engine which will operate with high efficiency but without perceptible vibration at all speeds and which embodies a new and improved arrangement of all parts and accessories, resulting in the elimination of parts and connections commonly present in engines of this type and the inclusion of other parts within the engine, the improved arrangement of parts combining to provide a well proportioned engine of pleasing appearance.

My invention aims also at the construction of a multiple cylinder engine in which the noise of moving parts and their connections is rendered unobjectionable and substantially imperceptible by reason of a new and improved arrangement and connection of parts.

Another object of the invention is to construct a cam shaft for an internal combustion engine in which the backlash from the valve springs will be effectively counteracted and the rotational movement of the cam shaft rendered regular, continuous and uniform.

Another object is to construct an internal combustion engine having water and oil pumps mounted in alignment with and driven directly from the ends of the cam shaft.

Another object is to construct a multiple cylinder V type engine having a one or two piece cylinder block and a one piece head.

Another object is to simplify the water pump construction and piping connections of the water circulating system of a V type internal combustion engine.

Another object is to provide a water pump for a V type internal combustion engine having a single inlet opening and outlet openings leading directly into the water jacket of each set of cylinders.

Another object is to construct a one piece cylinder block for an internal combustion engine of the V type provided with a cross conduit and longitudinal side recesses enclosed with cover plates, the conduit being adapted to lead the ignition wires to the spark plugs in closed passages thereby dispensing with outside separate wire conduits.

Another object is to construct a V type engine having a cam shaft mounted in the crank case between the cylinders and having vertical openings thru the block and head to accommodate tappet rod assemblies extending from the cam shaft to the overhead rocker arms.

Another object is to construct a multiple cylinder V type engine with crank case, cylinder block and head parts so designed as to be quickly and cheaply machined, and assembled to permit ready access to the interior of the engine or to the gears by removal of a minimum number of parts.

Another object is to construct an internal combustion engine of the V type having a plurality of cylinders arranged in a single block casting at an angle of from about 30° to 40° with each other.

Other objects and advantages more or less auxiliary to the above objects will be pointed out hereinafter.

In the drawings attached to this specification and forming a part thereof.

The engine shown in the drawings comprises a crank case 1 with an oil pan 2 affixed to its lower side and a cylinder block 3 mounted on its upper face, a head 4 seated on the top of the block and a cover 5 attached to the head and enclosing the mechanism mounted thereon.

The oil pan 2, which may consist of one or more parts, has the usual partition 6 provided with holes 7 and 8 thru which oil may drain to the bottom of the pan. At one corner of the oil pan is located an outlet 9 covered with a wire screen 10 to prevent the passage of dirt and foreign substances in the oil out into the lubricating system.

The crank case 1, as well as the oil pan, is preferably composed of aluminum alloys. It consists of side walls 11, front end wall 12 and rear end wall 13 comprising a substantially rectangular case open at top and bottom and having a cross web 14 located intermediate the end walls. The case is made rigid by the peculiar contour of the side walls 11 and ribs 12ª, 13ª, and 14ª in the walls 12 and 13 and cross web 14. Three main crank shaft bearing bosses 15 are integrally connected to the lower extremity of the walls 12, 13 and 14. Main crank shaft 16 is rotatably mounted in anti-friction bearings in these bosses by bearing caps 15ª. The walls 12, 13 and 14 are also provided at their upper extremity with other bearing bosses 17 to receive a cam shaft 18 with its bearings 19. These bosses which are longitudinally aligned on approximately the vertical center line of the crank case, project above the top of the crank case side walls as will be noted by reference to Figure 6.

The cam shaft is assembled in the bosses 17 by being passed lengthwise and rearwardly thru the bosses. It is held in assembled position in the bosses by front bearing 19 which engages a shoulder 18ª on the shaft to prevent forward movement and by gear 19ᶜ which engages with bearing 19 to prevent rearward movement of the shaft.

To facilitate machining of the top surfaces of the case, the end walls 12 and 13 terminate below the plane of the top of the side walls 11, thus making it necessary only to mill the longitudinally extending top edges 11ᵇ of the side wall 11, which can be done readily in a single milling operation.

The single piece block 3, preferably composed of cast iron, resembles two blocks, united by the ends 20 and 21 and an intermediate integral transverse web 22, and separated by centrally located vertical openings 23 extending thru the block from web 22 to each end 20 and 21. In each side of the block is cast a plurality of cylinders 24 inclined at an acute angle to the cylinders of the opposite side, the lower ends of the cylinders projecting below the lower surface of the block. This angle may obviously vary between certain limits but a maximum of about 40° and a minumum of 30° with a preferred angle of 35° is suitable. Water jacket chambers 25 surround the cylinders of each side of the block and are connected at each end, as at 26 and 27. At the front end of the block, openings 28 in the end wall furnish an inlet for water into each water jacket from the water pump.

The lower surfaces 30 of the block which are supported on the top plane surfaces 11ᵇ of the crank case may be machined by a single milling operation since they extend only lengthwise of and not across the block, the end surfaces being located above these surfaces 30 and out of contact with the corresponding surfaces of the crank case end walls 12 and 13 when the case and block are in assembled relation.

A cover plate 31 secured to the rear end of these parts closes the open space between the end walls 13 and 21. The corresponding open space at the front end of the engine between walls 12 and 20 respectively is similarly closed by a cover plate 32 which, however, is sufficiently large also to enclose the gears mounted on the crank shaft 16, cam shaft 18, distributor drive shaft 16ª, idler shaft 16ᵇ, chain 16ᶜ, etc.

A substantially triangular recess 33 is formed along each side of the block adjacent the cylinders, due to the inclination of the cylinders. These recesses are joined at their middle by a cross conduit 34 cored out in the transverse web 22. Ignition wires 35 carried in one of these recesses 33 are led across to the other recess 33 thru conduit 34 and thence to the spark plugs 36. When cover plates 37 are fitted to the sides of the block the recesses 33 are enclosed and the wires 35 as well as the bolts which secure the block and crank case together are hidden from view, thus giving to the engine a smooth unbroken exterior surface. Holes 35ª spaced conveniently in the cover plates permit the wires 35 to emerge from the recesses 33 at intervals adjacent the spark plugs 36. Also formed in the web 22 is another conduit 38 which extends from one side of the block inwardly to the center of the block and then vertically upward to the upper surface thereof. This conduit which constitutes part of the intake manifold is surrounded partially by cooling water where it passes between the cylinders and partially by heated engine gases where it extends upwardly in the center of the block. Gases passing thru the conduit are thus entirely protected from contact with outside air and have their temperature raised by heated fluids within the engine.

Figure 2:
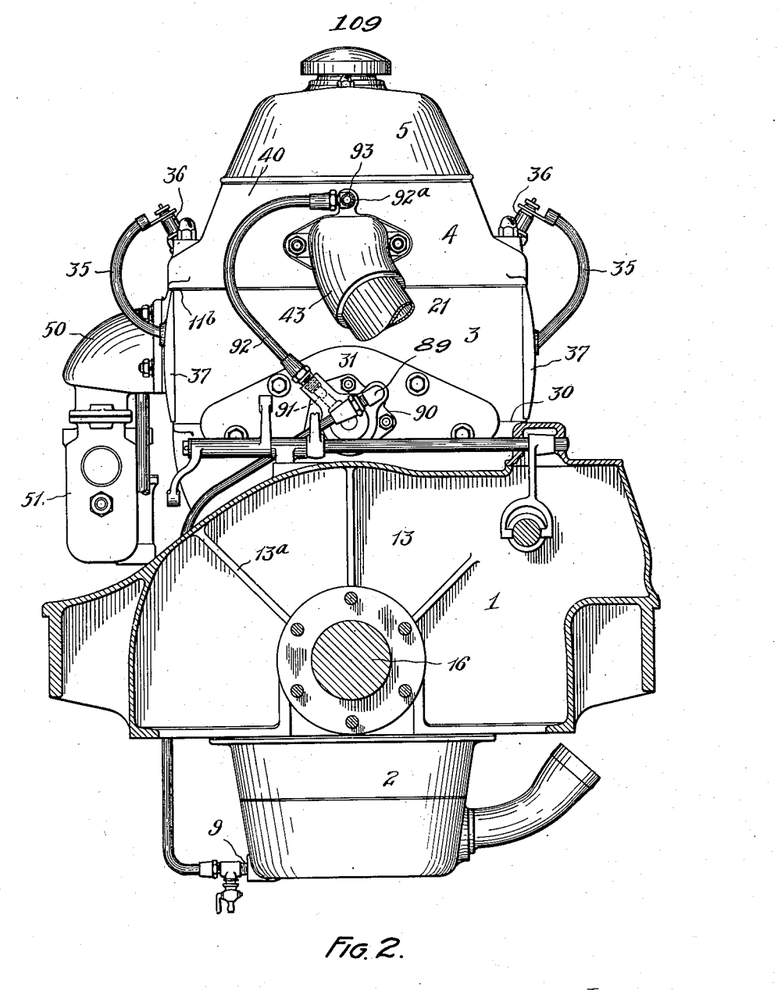
Fig. 2 is a rear end elevation with the fly wheel removed and portions of the crank case and crank shaft in section.
Figure 6:
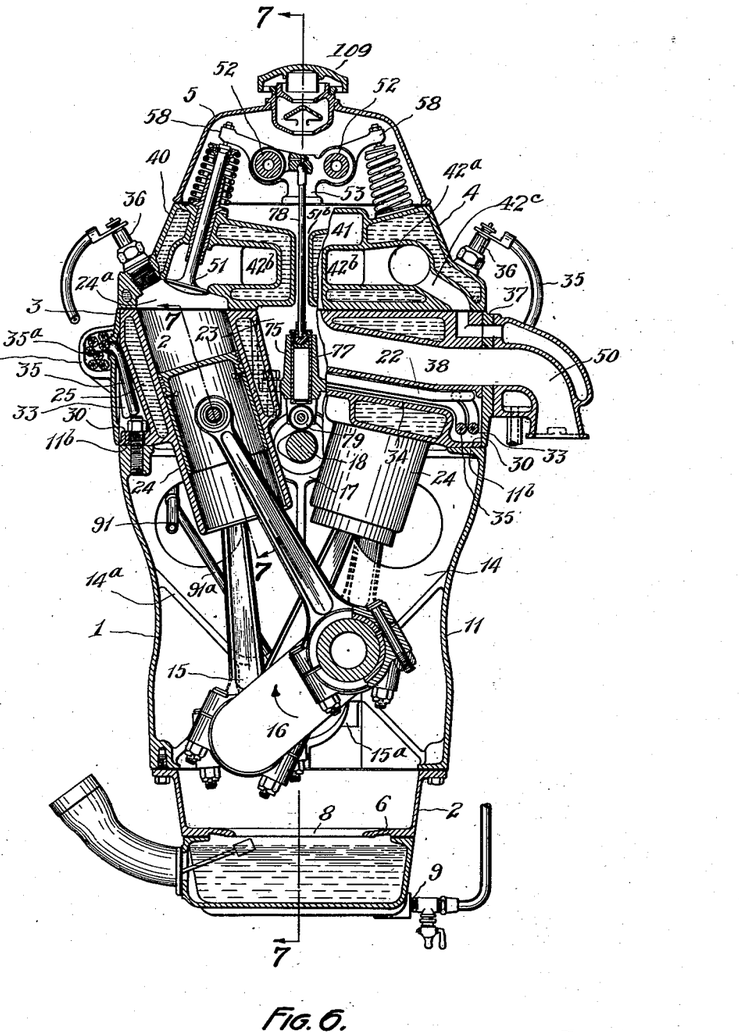
Fig. 6 is a vertical sectional view taken on line 6—6 of Figures 7, 9, and 10 with the crank shaft rotated about 225° from the position shown in Figure 7.
Figure 7:
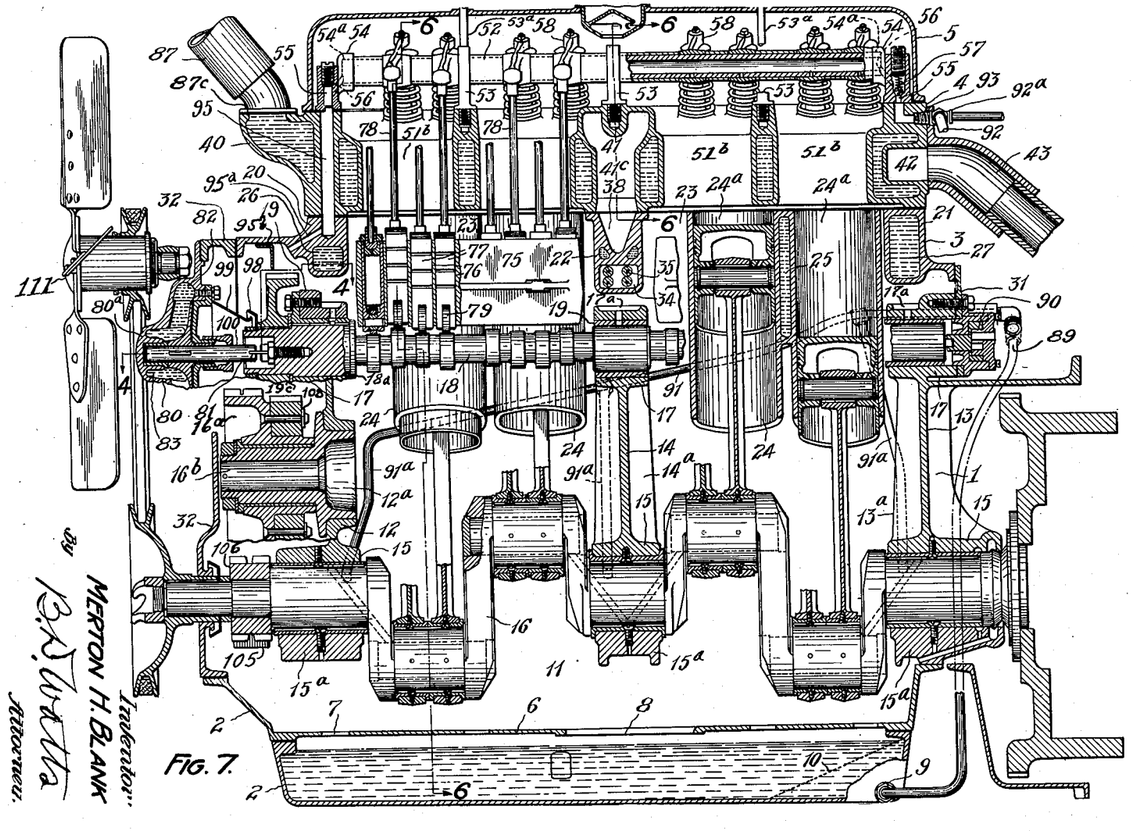
Figure 7 is a longitudinal vertical view in cross section taken on line 7—7 of Figure 6.
Figure 8:
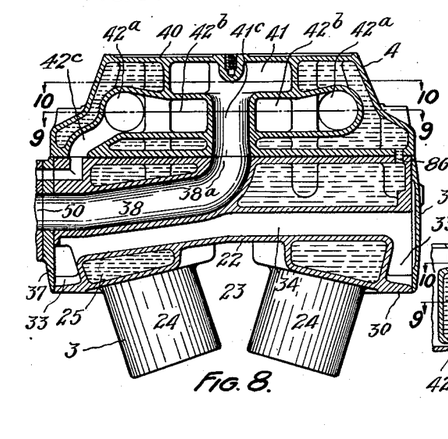
Fig. 8 is a vertical sectional view of the assembled head and cylinder block, taken on line 8—8 of Figures 9 and 10.
Figure 9:
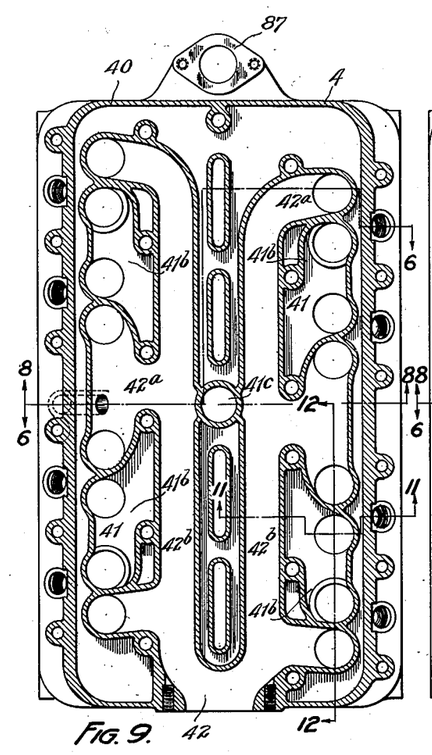
Fig. 9 is a horizontal section taken on line 9—9 of Figures 8, 11, and 12 showing the exhaust manifolds in section.
Figure 10:
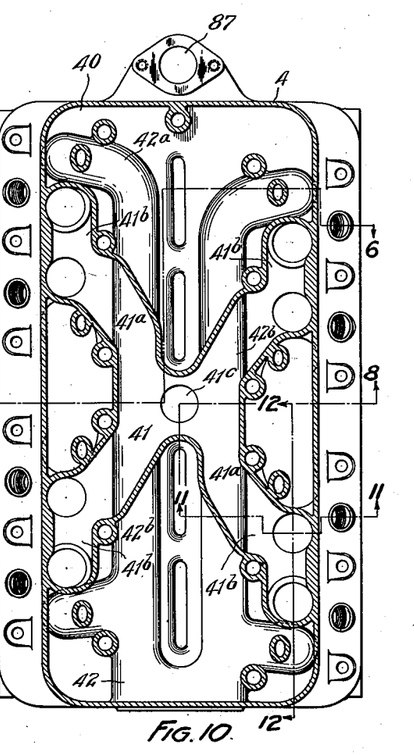
Figure 10 is a view similar to Figure 9 but taken on line 10—10 of Figures 8, 11, and 12 and showing the inlet manifolds in section and the exhaust manifolds in plan.
Figures 11, 12:
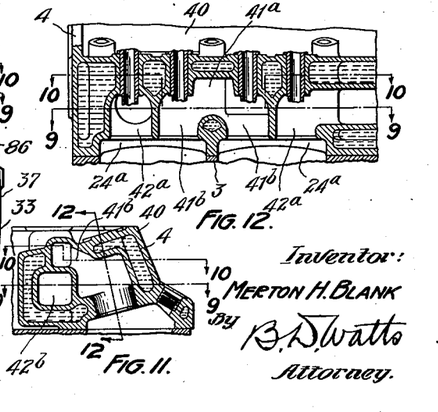
Figure 11 is a fragmentary sectional view taken on line 11—11 on Figures 9 and 10 showing the inlet manifold from the inlet header to the combustion chamber.
Figure 12 is a fragmentary cross section taken on line 12—12 of Figures 9, 10 and 11.

The head 4 is preferably composed of aluminum or other metals having relatively high heat conductivity altho metals such as iron may be employed if desired. It comprises a hollow casing 40 within which independent intake and exhaust manifolds 41 and 42 respectively are integrally formed. The exhaust manifold 42 is composed of main passages 42ᵇ and branch passages 42ª which connect the combustion chamber 24ª within the cylinders 24 to the adjacent main passage 42ᵇ. The passages 42ᵇ unite at the rear end of the head before passing thru the rear end wall and connect with an exhaust pipe 43. All walls of the exhaust manifold are spaced from the walls of the head except, of course, where the manifold opens into the combustion chambers and exhaust pipe 43. An auxiliary outlet 42ᶜ from an exhaust branch 42ª may be formed in the head and block to enter a jacketed intake elbow 50 which connects the carburetor 51 to conduit 38 as shown in Figures 2 and 6.

The inlet manifold 41 is located above the exhaust manifold in the head and is integrally united to the exhaust manifold thruout substantially its entire length, the two manifolds having a common dividing wall, as will be noted by reference to Figures 8 to 12 inclusive. At the center of the head directly over the open end 38ª of the intake conduit 38 in the block, a vertical passage 41ᶜ is formed to join with the conduit 38. This passage 41ᶜ extends upwardly to the top of the exhaust manifold 42 where it branches out into an enlarged chamber from which main passages 41ª lead toward the ends of each side of the head along the top of exhaust manifold 42. At points adjacent the various combustion chambers, passages 41ᵇ branch down over the side of the exhaust manifolds and communicate with the combustion chambers. Cooling water fills the spaces between the manifold walls and the walls of the head.

It will be noted that I have provided a head in which the exhaust manifold is spaced from the walls of the head and jacketed by cooling fluids, namely water and intake gases, and further that the intake gases are in direct contact with the heated walls of the exhaust manifold thruout substantially the entire length of the exhaust manifold and are highly heated thereby before entering the combustion chamber.

The complete intake gas conduit consisting of the jacketed elbow 50, the conduit 38 in the block and the manifold 41 in the head is completely protected from contact with outside air and is highly heated at all points. Complete volatilization of all liquid particles in the intake gases is thereby ensured and maximum fuel efficiency attained.

When the head is composed of a metal having good heat conducting properties, the temperature of the walls adjacent the combustion chamber may be maintained comparatively low due to the rapid distribution of the heat of such walls to all parts of the head from which it can be quickly absorbed by the cooling water and incoming fuel gases.

It is for this reason practicable to seat the valves 51 and spark plugs 36 directly on the metal of the head without intermediate metallic fittings and without danger of the metal becoming so soft, due to the high temperatures, as to deform or deteriorate. Vertical passages 51ᵇ the the head arranged above the openings 23 in the block form passages thru which tappet rods 78 extend.

Along the top of the head two parallel rocker shafts 52 are mounted in supports 53 and 54 secured to the head. The three intermediate supports 53 which thread into the head casting are each formed with two eyes thru which the shafts 52 pass and in which they are supported. The end supports 54 are fastened to the head and each carries two recesses 54ª adapted to form seats for the end of the shafts 52. Each support 54 has a vertical passage 55 and two inclined passages 56 leading therefrom to the recesses 54ª. In the passage 55 of the rear end shaft support 54 is mounted an oil pressure regulator 57 of the ordinary ball and spring construction.

The shafts 52 are hollow, the interior space communicating with passages 56 in supports 53 and 54 and with outlet openings 52ª spaced to correspond with the rocker arms 58 which are mounted on the shafts.

The rocker arms 58 comprises the usual boss 58ª thru which the supporting shaft passes, and oppositely extending branches 58ᵇ to engage with the valve stem 51ª and tappet rods. In one branch 58ᵇ adjacent the valve stem is an opening 59 threaded at one end and of slightly reduced diameter at the other end in which is located a slidable cup shaped member 60, an adjustable screw 61 having an elongated reduced end, and a spring 62 within the cup shaped member 60, pressing against the screw and cup. An outwardly projecting flange 60ª prevents the cup from dropping out of the opening 59 while a pin 60ᵇ extending into a slot in the cup 60, prevents rotation of the cup. A drilled passage 59ª leads from the opening 59 thru the arm to the boss 58ª where it communicates with oil grooves leading to the outlets 52ª in the shaft.

The spring 62 serves to maintain cup 60 in contact with the valve stem during operation of the engine, it being compressed to permit engagement of the screw 61 with cup 60 when the valve 51 is actuated. Adjustment of the rocker arms relative to the tappet rods and valves is made by movement of screw 61 within cup 60.

The noise of contact between the screw 61 and cup 60 is deadened by oil supplied to the cup from the shafts 52.

Figures 13, 15, 16, 18:
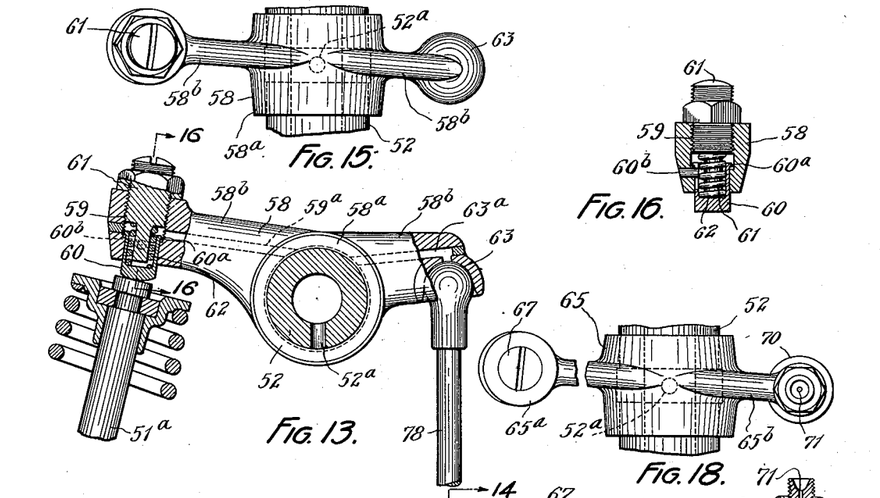
Figure 13 is a fragmentary view showing the valve actuating mechanism.
Figure 15 is a top plan view of the rocker arm shown in Figure 13.
Figure 16 is a detail sectional view of that portion of the rocker arm which contacts with the valve stem.
Figs. 17 and 18 are respectively a side elevational view partly in section and a plan view of a modified form of rocker arm.
Figure 14:
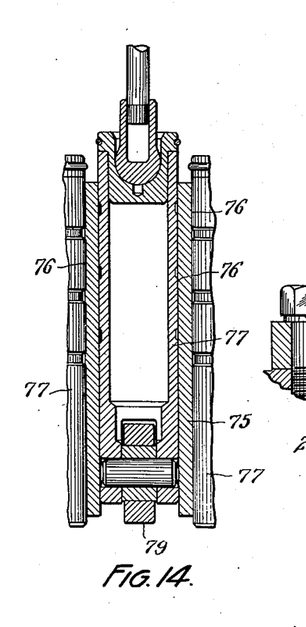
Figure 14 is a sectional view taken on line 14—14 of Figure 13.
Figure 17:
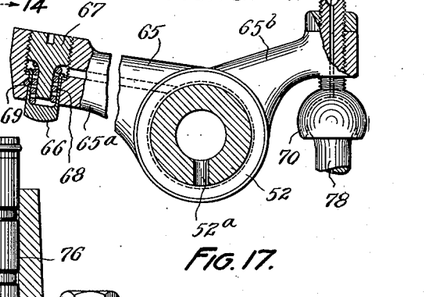

A modified form of rocker arm 65 differing from the above described arm 58 mainly in that the adjusting means is shown in Figs. 17 and 18. The branch 65ª adjacent the valve stem carries a cup 66, a screw 67 with an elongated end, and a spring 68 therebetween. A pin 69 may be used to retain the cup in the arm and prevents its turning. In the tappet rod branch 65ᵇ a screw threaded engaging member 70 is adjustably mounted. A passage for conducting oil to cup 66 is provided as in the arms 58 but the tappet rods engaging member 70 is lubricated by an opening 71 thru member 70 as shown.

Within each vertical opening 23 in the block 3 is mounted a member 75 having a plurality of vertical guide passages 76 in which tappet assemblies have a bearing. Each tappet assembly consists of a push rod 77 and a tappet rod 78. The push rod which slides in passages 76 has a roller 79 mounted in the lower end adapted to engage a cam surface on the cam shaft 18 and has also a recess in its upper end to seat the tappet rod 78 which at its upper end engages the rocker arm 58. To provide enlarged bearing surfaces the roller 79 rotates on its bushing which is non-rotatably secured in the push rod.

The cover 5 is a hollow shell which seats on head 4 and serves to enclose the valve stems, rocker arms and shafts. It may be secured to the head by nuts engaging threaded extensions 104 of shaft supports 53. A cap 109 in the top of the cover serves as a breather opening for the engine and may be utilized as an oil filling opening altho another oil filler and breather 110 is provided on the front end of the crank case.

Reference to Figures 3, 4, 7, and 8 will make clear the system of cooling employed. A centrifugal water pump 80 mounted on the front end of the engine is driven by a removable key 81 from the end of the cam shaft 18, the key being of such size and strength that it will give way in case the pump becomes clogged, without breaking the pump.

Cool water from the radiator (not shown) enters the pump thru a single, centrally arranged inlet 83 in the pump casing 80ª. Rotation of the moving element 80ᵇ of the pump forces the water out thru the two outlet openings 84, each of which is connected directly to the water jackets 24ª surrounding the rows of cylinders 24 on each side of the block, by means of bored openings in the block, and openings 85ª in the cover plates 32 which is interposed between the front end of the block and the pump casing. Altho the block 3 is a single casting and the water chamber is connected by cross passages 26 and 27, cool water is supplied to each side of this chamber in order that the cylinders of each side of the block may be maintained at a uniformly low, even temperature. Spaced passages 86, Figure 8, thru the upper wall of the water jacket of the block lead into the water jacket of the head. These passages are of such size and so arranged that the cool water reaches all of the cylinders and by creating complete circulation of water in all parts of the jackets tends to maintain a uniform temperature therein. A short tube leads cooling water from the single outlet 87ᶜ to the radiator thus completing the cooling circuit. The cock 88 permits drainage of the pump.

The lubricating system comprises forced and gravity feed. A gear oil pump 90 mounted on the rear end of the engine and driven by a direct connection to the cam shaft 18 has an inlet connection 89 with the oil pan 2 and also has two outlet openings, one of which leads thru the block 3 and is connected to a pipe line 91 extending along the sides of the crank case and having branches 91ª connecting with the main crank shaft bearing bosses 15. Oil forced from the pump into this pipe line is delivered to the crankshaft bearings, from each of which it is carried inside the hollow portions of shaft 16 to the adjacent connecting rod bearings. The oil thus forced out of the crank shaft and connected rod bearings serves to lubricate the walls of the cylinders and the pistons therein. The other outlet opening from the oil pump is thru the pipe line 92 located on the outside of the engine, which connects with a T 92ª having threaded engagement with the tapped opening 93 in the head and also with a branch pipe leading from T 92ª to an oil pressure gauge. The tappet opening in the head leads inwardly and upwardly in the head casting to the passage 55 in the support 54 in which the pressure regulator or adjustable valve 57 is located. Oil forced out of the pump builds up a pressure in oil lines 91 and 92 due to the valve 57, which, when the pressure becomes sufficiently great, permits oil to escape into the hollow rocker arm shafts 52. Outlet passages 56 in the front end shaft support 54 unite in an enlarged passage 55, which connects with a vertical passage 95 in the head leading thru passage 95ª into the gear case at the front of the engine. Pressure may be put on the oil in the rocker arm shafts by suitably regulating the sizes of inlet and outlet openings. Oil in the hollow arm shafts, in part, escapes into the branches of the rocker arms 58 and thence down the valve stems and tappet rods, lubricating these parts and their guides and the cam surfaces on the cam shaft and finally returning to the oil reservoir thru the crank case. Oil escaping from the rocker arms also collects on the head casting and flows down thru the vertical tappet rod openings in the head along the walls of the block to points immediately above the cam shaft bearings, where it drops into oil cup 17ª on the upper surface of the cam shaft bearing bosses 17 from which it is led into the bearings 19.

Oil which passes out at the front end of the hollow rocker arm shafts flows thru passages 95 and 95ª in the front of the head and block to a point above the gears. In flowing downwardly from the mouth of passages 95ª it lubricates the various gears, shafts, and driving chain including the distributor drive shaft 16ª, as will be understood by referring to Figures 5 and 7, which shows an oil cup 96ª leading into the distributor shaft boss 96 and along the shaft to sprocket 97.

Provision is made to prevent leakage of oil into the water pump. This is accomplished by an oil thrower 98 attached to the front end of the cam shaft and by a conically shaped member 99 arranged within this thrower and around the water pump shaft 100. Oil accumulating on the outer surface of this member 99, flows to the smaller end, which is flanged outwardly, and then around to the lower side of the member from which it drips off. Baffle plate 95ᵇ adjacent opening 95ª directs the oil away from member 99.

Figures 3, 5:
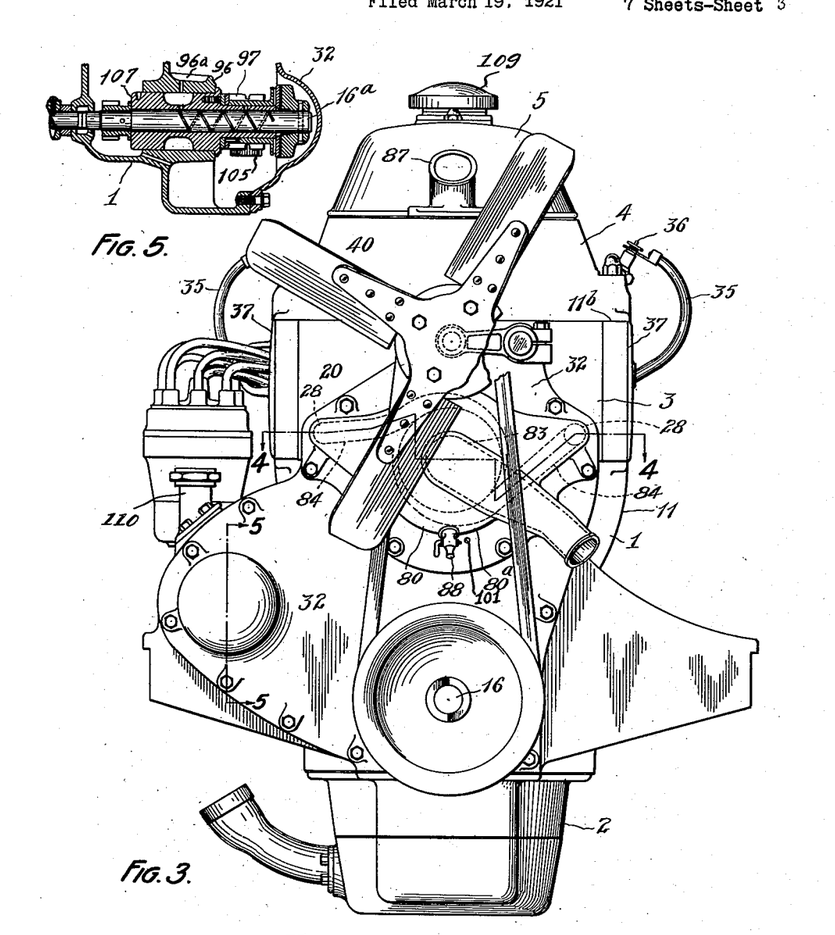
Fig. 3 is a front end elevation with certain interior parts of the water pump indicated by dotted lines.
Fig. 5 is a vertical fragmentary section taken on line 5—5 of Figure 3.
Figure 4:
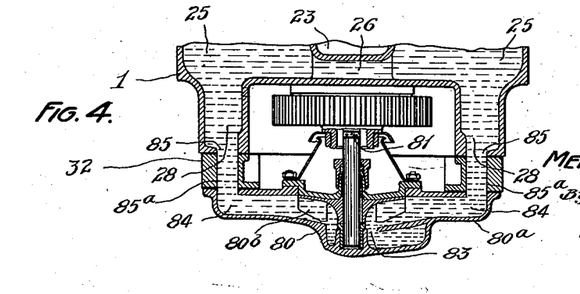
Fig. 4 is a horizontal section taken on line 4—4 of Figures 3 and 7, showing details of the water pump construction and its connections to the water jackets of the cylinder block.

Provision against entrance of water from the water pump into the crank case is made in the stuffing box around shaft 100 and conical member 99. Any leakage thru the stuffing box is caught by member 99 and led to the exterior of the engine thru a small opening 101 in the pump casing 80 as shown in Fig. 3.

Figure 1:
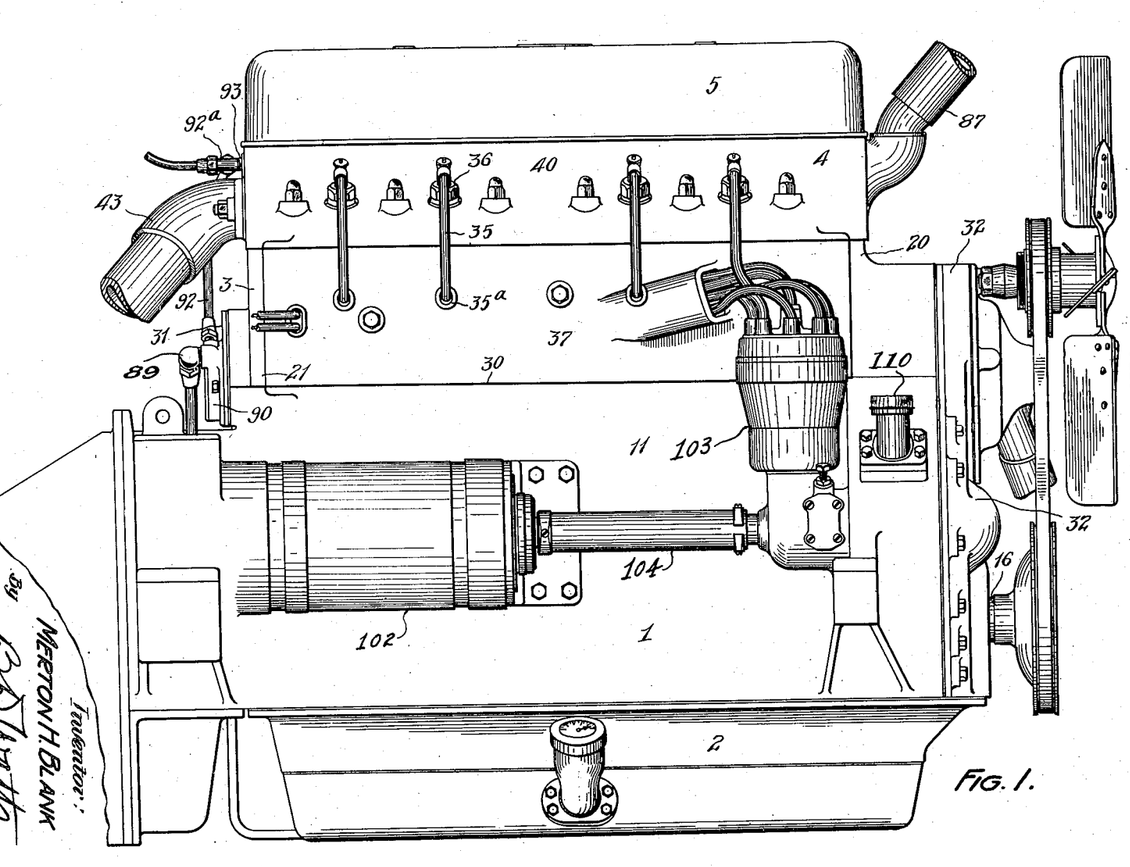
Fig. 1 is a right side elevation of my completely assembled engine.

Fig. 1 shows the location of motor generator 102 and distributor 103 on the right hand side of the engine. The generator has meshed gear engagement with the engine fly wheel for starting purposes but for other purposes is driven by a hose connection 53ª from distributor drive shaft 16ª. The distributor is driven by a spiral gear on shaft 16ª.

The moving parts of the engine are connected for actuation as follows. Chain 16ᶜ engages sprocket 106 on crank shaft 16, sprocket 97 on shaft 16ª, and idler sprocket 16ᵇ. Chain tightening means is provided on shaft 16ª by the movable bushing 107 on which sprocket 97 is eccentrically mounted. Idler sprocket 16ª carries a gear 108 to mesh with a gear 19ᶜ on the end of cam shaft 18. It will be noted that a minimum number of intermediate connections between moving parts is provided and unnecessary noise thereby avoided.

It will be evident from the foregoing description and the drawings that access may be had readily to all interior parts of the engine. Removal of cover 5 exposes the rocker arms, tappet rods and valve stems while removal of the head 4 and cover 5 as a unit gives direct access to the combustion chambers, valves and push rods. By detaching oil pan 2, the crank shaft, connecting rods and pistons are accessible. Front cover plate 32 may be removed, carrying with it the water pump 80 and fan 111 and exposing the gears, shafts and chain housed in the front end of the crank case. The cam shaft is removable from bosses 17 by endwise withdrawal after cover plate 32 and bearings 17ª detached from the crank case.

It will further be noted that by reason of the improved and compact arrangement of parts, the complete engine has an appearance closely resembling, but superior in many respects to, the ordinary multicylinder, vertical type engine. The acute angle between the rows of cylinders and the relatively tall crankcase with cylinder barrels extending well down into it make possible the use of single block and head parts but little wider than those of a vertical type engine. The space between the rows of cylinders is occupied by the cam shaft and push rods while the tappet rods pass thru openings in the head and engage the overhead rocker arms.

An important advantage incident to the provision of the vertical tappet rod holes in the head is that the overhead rocker arms may be lubricated by forced feed and the lubricant returned to the oil pan by gravity in such a manner as to lubricate all moving parts except the main crank shaft, pistons and connecting rods.

Intake and exhaust manifolds incorporated within the block and head obviate the necessity of exterior manifolds while exterior independent wiring manifolds are avoided by utilizing the longitudinal pockets adjacent the cylinders in the block. Water tube connections from the pump to the water jackets of each row of cylinders are unnecessary since the pump is mounted on the end cover of the block and communicates directly with water passages leading thru the cover and into the block.

An important advantage of the smooth, exterior surface free from the many usual appurtenances, projections and sharp angles is that it may be easily and cheaply burnished, lacquered, or otherwise provided with a high polish which can be maintained in a clean condition with a minimum of effort.

My improved engine possesses many unusual advantages not apparent from an inspection of the drawing, among which is the absence of noise and vibration when in use. In eliminating noise the improved rocker arms and the attachment of water and oil pumps to the cam shaft are important. By the former, contact of the rocker arm with the valve stem always occurs within a body of oil regardless of the temperature of the engine the noise of contact thus being deadened or completely silenced.

By the latter, rotation of the cam shaft is rendered regular and backlash on the shaft and shaft driving gears is succesfully offset or counteracted, the liquid in the pumps effectively preventing the intermittent forward and backward rotational movement of the shaft occasioned by the valve springs which press the push rods against the cam surfaces on the cam shaft.

The absence of vibration, particularly the periods of vibration, at certain speeds, which occur in all engines with which I am familiar, is none the less actual altho not, as yet thoroughly explainable. No vibration noticeable from the driver's seat of an automobile mounting my engine has been detected between car running speeds of from about two to about seventy miles per hour.

The true explanation of this lack of vibration is not definitely known but my theory is as follows: Due to the small acute angle between the rows of cylinders the reciprocating masses move in nearly vertical planes, the forces of the one plane tending largely to neutralize those of the other. Combined with this more or less complete neutralization of reciprocating forces are the unusual intervals between firings which latter occur in pairs the individual firings of each pair being separated by about thirty five degrees and the pairs of firings being separated by about 145°. The combination of the spacing of firings with the location of the planes of reciprocating masses apparently prevents any such synchronizing of forces, over a wide range of speeds, as would result in noticeable vibration.

Altho I have, for purposes of illustration described in detail one particular embodiment of my invention, I do not wish to be limited thereto since, many changes in the design and arrangement of parts will doubtless occur to those skilled in the art without a departure from the scope of my invention as defined in what is claimed.

What is claimed:

1. In a multiple cylinder internal combustion engine, in combination, an engine having fluid carrying chambers therein, a cam shaft, a crank case having openings at each end, a cover plate for each opening, each cover plate having an opening therein, fluid impelling devices each closing the said opening in the cover plates and having outlets communicating directly with the said fluid chambers within the engine, each of said fluid impelling devices being connected to be driven from the respective ends of the cam shaft.

2. In an internal combustion engine, a single piece block comprising rows of cylinders arranged at an acute angle to each other, a cross web intermediate the end of the block, a gas intake passage in the cross web and an auxiliary exhaust gas passage in the block adjacent the said intake passage.

3. In an internal combustion engine, a single piece block comprising rows of cylinders inclined at an actue angle to each other, a cross web intermediate the end of the block, longitudinal recesses in opposite sides of the block and a transverse conduit in the said web joining the recesses, the said recesses and conduit being adapted to receive ignition wires, and side cover plates to enclose the said recesses.

4. In an internal combustion engine in combination a single piece block comprising a plurality of cylinders, the said cylinders being arranged in longitudinal rows inclined at an acute angle to each other, vertical openings separating the rows of cylinders, a single piece head having vertically openings aligned with the vertical openings in the said block and valve tappet assemblies adapted to reciprocate in the said aligned openings.

5. In an internal combustion engine in combination a crank case, a cam shaft carried thereby, a block comprising a plurality of cylinders projecting into the crank case on opposite sides of the cam shaft, vertical openings in the block adjacent the cam shaft, a head having vertical openings aligned with the said openings in the block and valve tappet assemblies adapted to be actuated by the said cam shaft and to reciprocate in the said aligned openings.

6. In a multiple cylinder, V type, internal combustion engine, in combination, a crankcase open at the top, a main crank shaft and a cam shaft mounted in bearings therein in substantially vertical alignment, a cylinder block having cylinders arranged in longitudinally extending rows inclined at an angle to each other, and upon opposite sides of a vertical plane passing thru the cam shaft and crankshaft, passages through the block between the rows of cylinders, a head comprising recesses located to register with the ends of the cylinders and constituting portions of the combustion chambers, passages through the head between the said recesses, manifolds within the head, ports for the manifolds in the said recesses, valves for the said ports, the valves of one row of cylinders being inclined toward those of the other row and valve operating means located in the said passages in the block to engage the cam shaft and extending through the said passages in the head.

7. In a multiple cylinder, V type, internal combustion engine, in combination, a crank case, a crank-shaft and a cam shaft rotatably mounted in the crank case, a cylinder block having rows of cylinders converging downwardly and separated by passages extending through the block, a head having centrally disposed openings extending therethrough and having intake and exhaust manifolds in the interior thereof, valve openings in the manifolds for each cylinder, valves for the valve openings projecting through the said head, a rocker arm shaft on the head, rocker arms rotatably mounted on the said shaft, and valve operating means comprising tappet assemblies extending through the said passages in the head and block and engaging the said rocker arms and cam shaft.

8. In a multiple cylinder, V type, internal combustion engine, in combination, a crankcase, a crankshaft rotatably mounted therein, a cam shaft rotatably mounted in the crankcase in vertical alignment with the crank shaft and in horizontal alignment with the upper side of the said crank-case, a cylinder block having cylinders arranged in longitudinal rows converging downwardly and separated by central passages extending through the said block, the said cylinders projecting into the crankcase, on either side of the crankshaft, a head for the block having rows of valve ports registering with the cylinders, centrally located passages extending through the said head between the rows of ports and in alignment with the said central passages in the said block, valves in the head for the said valve ports, and valve operating mechanism having engagement with the cam shaft and extending through the central openings in the block.

9. In a multiple cylinder, internal combustion engine, in combination, a plurality of cylinders arranged in longitudinal rows inclined to each other, cover plates forming longitudinally extending conduits adjacent the outer side of each row of cylinders, a cross conduit through the engine joining the said conduits, an enlarged intake opening in one of the said cover plates and a plurality of spaced outlet openings in each of the said plates, a distributor adjacent the said intake opening and ignition wires leading from the distributor into the said intake opening and out the said outlet openings.

10. In a multiple cylinder, V type, internal combustion engine, in combination a plurality of jacketed cylinders arranged in longitudinal rows inclined to each other, a spark plug for each cylinder, said cover plates forming longitudinal conduits with the cylinder jackets, a cross conduit joining the said conduits, the said cover plates having outlet openings adjacent the said spark plugs, one of said cover plates having an enlarged intake opening, a distributor adjacent the said intake opening and ignition wires leading from the distributor into the conduit through the intake opening and from the outlet openings to the spark plugs.

In testimony whereof, I hereunto affix my signature.

MERTON H. BLANK.